2,516,014

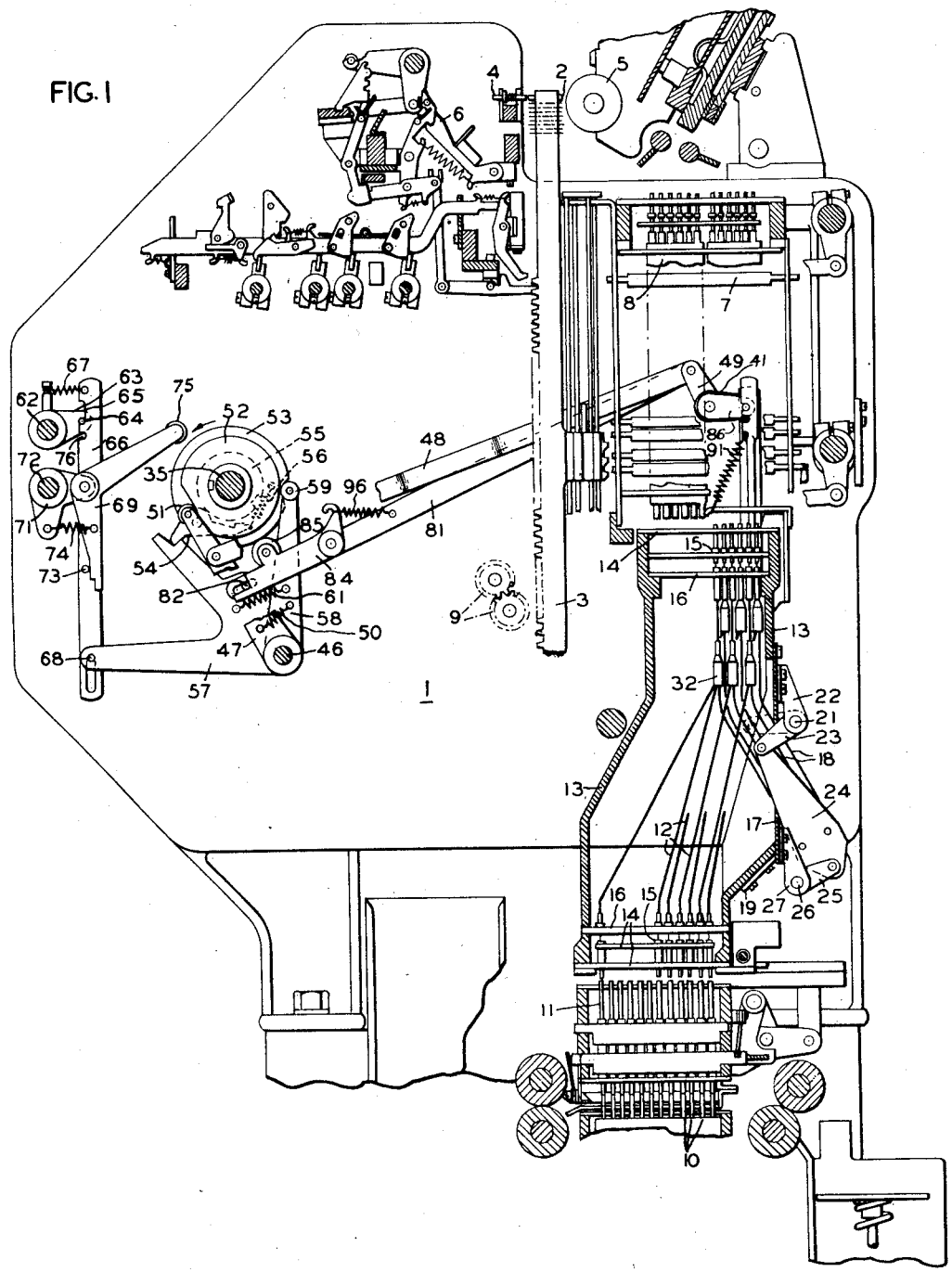

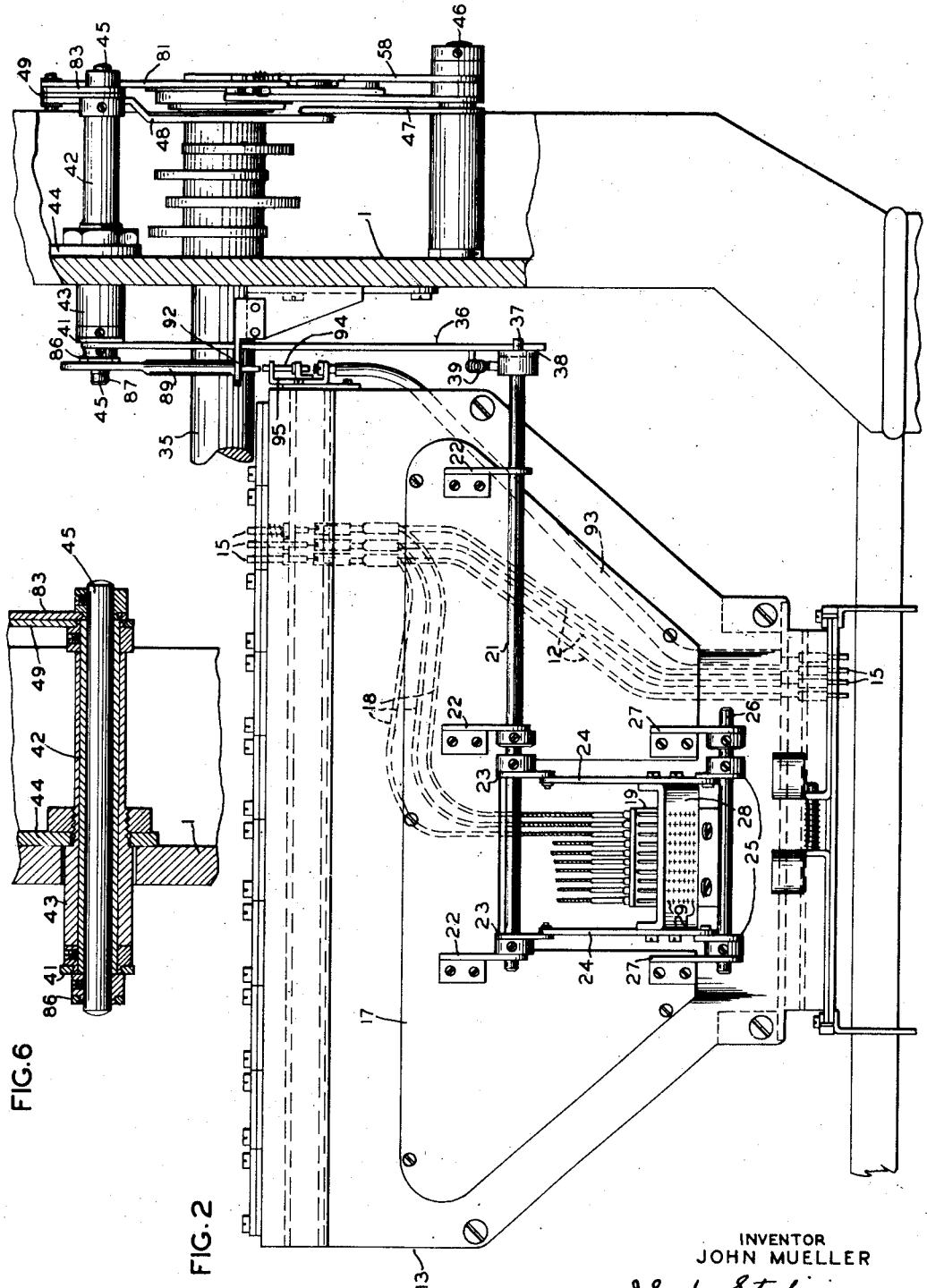
July 18, 1950
J. MUELLER
2,516,014
DATA ENTERING MECHANISM FOR CARD CONTROLLED ACCOUNTING MACHINES
Filed Oct. 18, 1945
3 Sheets-Sheet 2
INVENTOR
JOHN MUELLER
BY
ATTORNEY July 18, 1950  J. MUELLER  2,516,014
DATA ENTERING MECHANISM FOR CARD
CONTROLLED ACCOUNTING MACHINES
Filed Oct. 18, 1945  3 Sheets-Sheet 3
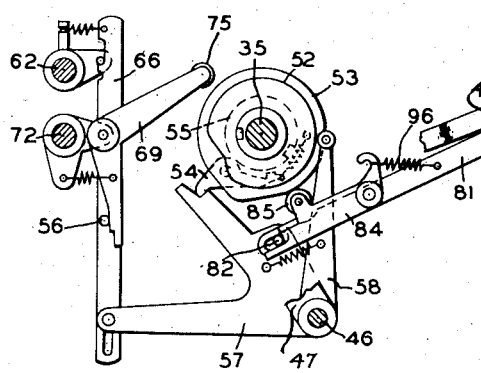
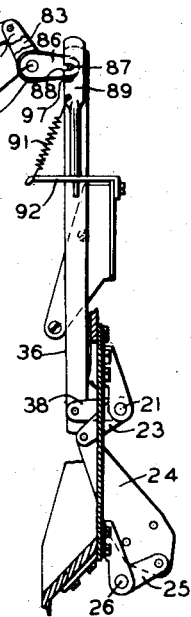
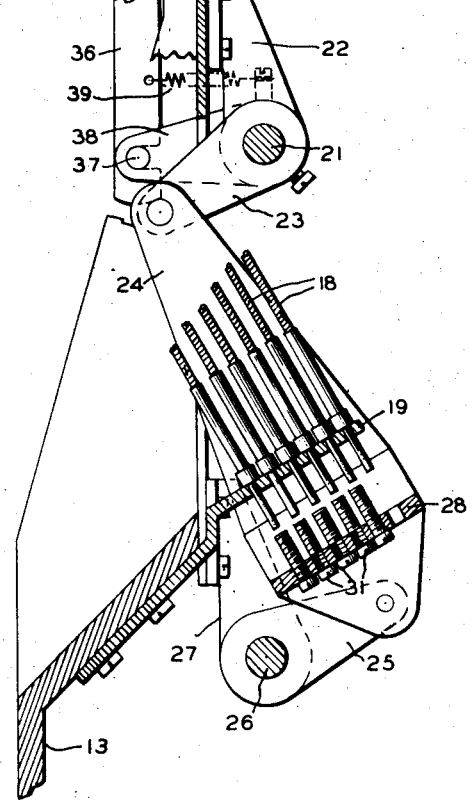
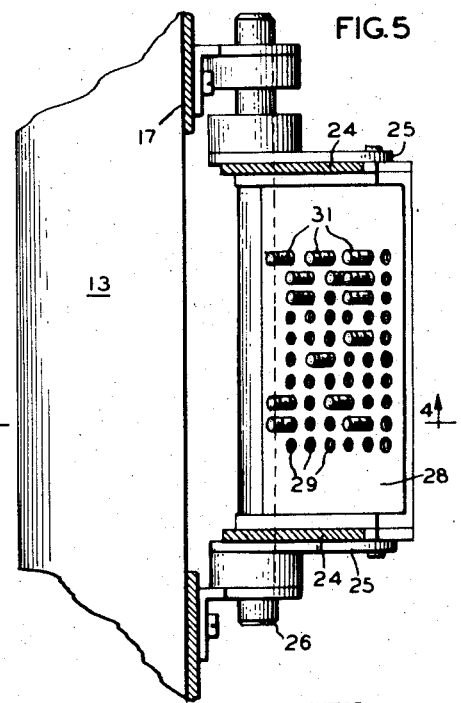
INVENTOR
JOHN MUELLER
BY *J. L. Sterling*
ATTORNEY Patented July 18, 1950

UNITED STATES PATENT OFFICE 2,516,014

DATA ENTERING MECHANISM FOR CARD CONTROLLED ACCOUNTING MACHINES

John Mueller, North Bergen, N. J., assignor to Remington Rand Inc., Buffalo, N. Y., a corporation of Delaware Application October 18, 1945, Serial No. 622,968

11 Claims. (Cl. 235—61.6)

This invention relates to card controlled accounting machines and has more particular reference to an improvement by which data pertaining to one or more cards may be manually preset in the machine and entered at appropriate times to control the operation of the machine in accordance therewith.

One object of the invention is to enable the entry at predetermined times in a card controlled machine operation of informative data in addition to that represented by the usual perforation patterns of the cards being run.

An additional object is to reduce the amount of card punching heretofore required to attain a given card controlled machine operation.

A further object is to increase beyond the normal capacity of a statistical card the amount of informative data obtainable by a card controlled machine from such a card.

In many forms of card-controlled machine operations there are often certain items of data common to a plurality of the cards being run and which accordingly are repeatedly entered in the machine throughout the operation. For example, when a card controlled tabulator is set up and used for posting customers' bills, items common to a plurality of cards would be the date of the bill, a standard fixed service charge, or a similar item any one of which items remains constant for each customer and heretofore was required to be repeatedly punched in an appropriate card pertaining to each customer's account. In practice, such data could be punched either in a punch field reserved for that purpose in a specified card pertaining to the account or else in a special card inserted in proper sequence among the usual cards pertaining to each account. In either case, however, such data, in order to be included in the tabulation, must have been represented by a perforation pattern in a card. Through the novel means herein disclosed, any data within the capacity of the device, such as a date or a service charge can be preset in the machine and entered at appropriate preselected times in the type bar positioning mechanism of the machine. By so providing, the necessity for separately punching such data for each account is herein eliminated, enabling use of the punch field of the card, heretofore required to be reserved for such data, for other purposes.

As will be seen from a reading of the following description, tabulation of the repetitive matter presettable in the machine is effected through some of the regular type bars of the machine, which selected type bars may be used in other runs of cards or in other cycles of the same run of cards for printing and accumulating, in the usual manner, data represented by perforation patterns in the cards. The device may be brought into operation in various ways and at various times depending on the requirements of the work. Two illustrative ways are described herein viz., one associated with the total taking control mechanism of the machine, and another under control of a special perforation in a card.

Other objects and structural details of the invention will be apparent from the following description when read in connection with the accompanying drawings, wherein:

Fig. 1 is a side sectional elevation of the head of a tabulating machine showing so much of the mechanism therein as relates to the present invention;

Fig. 2 is a rear view showing the translator unit and other related parts of said machine;

Fig. 3 is a fragmentary view in section showing some of the elements of the invention in relation to the front drive shaft of the machine;

Fig. 4 is a side sectional view of the rear of the translator unit shown in Fig. 2;

Fig. 5 is a plan view of the mechanism shown in Fig. 4; and

Fig. 6 is an enlarged sectional view of certain rock shafts shown in full in Fig. 2.

The invention is hereby disclosed in an embodiment adapted for a punched card tabulator of the well known Powers type as shown and described in my prior Patent No. 2,381,361, dated August 7, 1945.

As can be seen in Fig. 1, and as more fully described and shown in the aforesaid patent, the tabulator head includes a supporting cast frame 1, printing being effected from a row of type 2 carried by each of a series of differentially settable type bars 3 the controlled movement of which bars is adapted to position its respective type between a firing pin 4 and platen 5 at the time a type hammer 6 is released. Engageable with each type bar is a vertical row of stops 7, the release of any one of which results in limiting the movement of the type bar to determine its respective printing position. Each row of stops is associated with a set of individually actuable permutation bars 8 each set corresponding to a card column, the selective displacement of any one or combination of said bars in a set in accordance with the perforation pattern in a card column resulting in release of one of the respective stops 7 associated therewith. Also engageable with certain groups of said type bars are totalizer wheels 9 which are actuated by the movement of the bars in item tabulating cycles of the machine and which act to limit the movement of the bars in total cycles of the machine. As is well known in this art, the perforation pattern of a card is detected by reciprocating sensing pins 10, and is registered by the sensing pins in the upward displacement of a plurality of set pins 11 in the identical pattern. The movement of the set pins is transmitted to their respective permutation bars 8 through a series of interposed Bowden wires 12 supported in a removable structure generally referred to in machines of this class as a translator unit.

Said translator unit is formed by joining a pair of castings 13 into a frame structure the lower and upper end of which each supports a pair of perforated plates 14 suitably spaced for housing a set of shouldered pins 15. An additional plate 16 disposed to the inner side of each of said pair of plates 14 contains threaded perforations to which are secured the nipples of the Bowden wires 12 and through which project the core of the wires to co-act with the pins 15. Although not shown in the drawings for reasons of clarity it is understood that a full complement of upper and lower pins 15 is normally provided so that the movement of any set pin 11 will effect displacement of its corresponding permutation bar 8. It can be seen that the plan by which the lower translator pins are wired to the upper translator pins determines the relative position on a sheet or bill in which the data contained in a given card column will be printed.

In the present instance, the usual translator is provided with additional mechanism through which the upper translator pins 15 may be actuated independently of the movement of the set pins 11. To this end a cover plate 17, secured to the rear translator casting 13, best seen in Figs. 2 and 4, is partially cut away to allow passage of an additional group of Bowden wires 18. The exposed ends of said wires project through perforations in a supporting plate 19 secured to the translator frame casting, which perforations are threaded for securing the nipple of each wire. A rock shaft 21 supported in brackets 22 secured to the cover plate 17 carries a pair of rock arms 23 each of which is pivotally connected by links 24 to a respective rock arm 25 carried by second rock shaft 26 supported by brackets 27 also secured to the cover plate 17.

A setting plate 28 (see also Fig. 5) extending between and firmly secured to the links 24 is provided with a plurality of threaded perforations 29 representing index positions and corresponding in number and position to the Bowden wires 18 mounted in the supporting plate 19. The construction is such that a rocking of shaft 21 in a clockwise direction as viewed in Figs. 1 and 4 results in lifting the setting plate perpendicularly towards the Bowden wires 18 supported in the plate 19. It can be seen that by selective insertion of set screws 31 in the setting plate in a data representative pattern, a corresponding one or combination of the wires 18 will be actuated by the screws whenever the shaft 21 is rocked.

Each of the wires 18 is adapted to actuate one of the upper translator pins 15. Preferably this result is accomplished by joining each wire 18 with a corresponding wire 12 in the well known inverted Y wire connection 32 commonly employed in machines of this class and which permits actuation of upper pins 15 by either wire independently of the other. In this manner it can be seen that movement of the setting plate 28 containing a pre-set data representative pattern of set screws 31 will transmit that pattern through the unit to the permutation bars 8 to result in positioning of type bars 3 as previously described. The particular wire 12 with which an additional wire 18 is joined obviously is determined according to the requirements of the user and the nature of the data set up in the plate 28. When the setting is used for entering a numeric item such as a service charge for inclusion in a total, the wires 18 responsive to the numeric portion of the setting would accordingly be joined with those wires 12 actuating permutation bars 8 which control adding type bar 3. When only printing of the settable data is desired, then the wiring may be determined in accordance with the relative position on the sheet in which the printing is desired. If the mode of operation of the device, as hereinafter more fully described, requires printing of the preset data on the same line as the printing of data contained in a card, it is of course apparent that the additional wires 18 be so connected as to actuate the permutation bars 8 corresponding to a blank field of columns in such card. In other modes of operation, however, the wiring of the additional Bowden wires 18 need not be so limited.

The means for rocking shaft 21 are associated in the present instance with a shaft 35, usually referred to as the front drive shaft of the machine, and include, as seen in Fig. 2 a link 36 the lower end of which has a recessed notch for receiving a pin 37 carried by an additional rock arm 38 secured to the shaft 21. A spring 39 acts to hold the link in engagement with the pin. The upper end of link 36 is pivoted to an arm 41 fixed to a hollow rock shaft 42. As best seen in Fig. 6, the hollow shaft 42 is journaled in a sleeve 43 extending through and secured to a plate 44 mounted on the left hand frame 1 of the machine and supports a second rock shaft 45, each of said shafts being free to rock independently of the other. As described in the aforesaid Patent 2,381,361 that portion of the front drive shaft 35 extending outside of the frame 1 carries a group of cams associated with a group of levers mounted on a stud shaft 46 secured to the frame, through which mechanism movement of the machine totalizers is effected. In the instant case both the shaft 35 and shaft 46 have been extended to include additional hereinafter described parts constituting elements of the present invention.

As seen in Figs. 1 and 3a follower arm 47 mounted on the stud shaft 46 is pivotally connected by a link 48 to a second rock arm 49 secured to the hollow shaft 42. A follower roller 51 carried by the arm 47 normally rests in the recessed surface of a cam 52 loosely mounted on the drive shaft 35. The rotation of cam 52 in a counterclockwise direction rocks the follower arm 47 counterclockwise against tension of a spring 50 pulling on the link 48 which through the shaft 42 and aforementioned linkage pulls on the setting plate 28 so as to actuate each Bowden wire 18 aligned with a set screw 31.

The cam 52 is actuated through clutch means associated with a second cam 53 mounted on the continuously rotating drive shaft 35. Although cams 52 and 53 are loosely mounted on the shaft, they are integral with each other and accordingly rotate in unison. A clutch dog 54 pivoted to cam 53 has a tooth engageable with a notch cut from a clutch disc 55 fixed on the shaft 35. A spring 56 tends to pull the dog into locking engagement with the disc, a shouldered trip arm of a bell crank lever 57 carried by the stud shaft 46 engaging the lip of the dog 54 to hold the dog in normally disengaged position as shown. The counter-clockwise rocking of the lever 57 releases the dog to engage at the proper time of the cycle, the clutch disc 55 thus rotating the cams. The lever 57 upon return to its normal position bears on the lip of the rotating dog rocking it clockwise about its pivot point to result in disengagement of the clutch. A detent lever 58 mounted on the shaft 46 carries a roller 59 normally engaging a recess in cam 53 so as to retain the cams in their normal positions when not operative. A spring 61 serves to yieldably retain both levers 58 and 57 in their normal positions as shown.

With the present embodiment of the invention, it is desired to be able to print the data set up in the setting plate, shown in Fig. 5 as a pattern representation denoting in Powers 90 column code the date "April 15 42," in conjunction with every total taking operation of the machine. As fully described in the aforesaid patent a total taking operation suspends the normal item tabulating cycles of the machine's operation to allow for an idle cycle and a total cycle before the first item cycle of the new group of cards to be totaled. A shaft 62 (Figs. 1 and 3) commonly referred to as the credit balance shaft extends across the front of the machine and is rocked clockwise early in said idle cycle by total taking control mechanism and returned to normal position, as shown, in the total cycle. A rock arm 63 secured to the shaft 62 carries a pin 64 bearing on the shoulder of an elongated recess 65 formed in the upper end of a push link 66. A spring 67 yieldably holds the link against the pin. The lower end of the push link contains a slot engaging a pin 68 on the actuating arm of the bell crank lever 57. With the shaft 35 which is geared to rotate one revolution per cycle shown in its position at the start of a cycle, it will be seen that the rocking of the shaft 62 early in the idle cycle will through the push link 66 trip the clutch dog 54 which, near the end of that idle cycle, will engage the disc 55 to actuate the cams 52 and 53. In the normal operation of the machine, the permutation bars 8, when raised by the set pins 11 under control of a card, are in their raised actuated position at the start of a cycle and are retained in such position until near the end of the same cycle. Printing, as determined by the displacement of said bars, occurs near the middle of the cycle. The shape of cam 52 is such that the permutation bars raised by it through the action of the setting plate 28 are actuated and returned to normal at substantially the same periods in the machine cycle.

Accordingly it will be seen that the first revolution of cam 52 will result in holding the permutation bars in actuated position during the total cycle of the machine. However, as is well known in this art, during total cycles the stops 7 are held retracted and actuation of said permutation bars does not control the type bar movement, printing being effected from type bars controlled by the totalizers 9 and other elements of the machine. For this reason provision is made to permit cams 52 and 53 to complete a second revolution the effect of which will raise permutation bars to an actuated position during the first succeeding item cycle of the machine. Since the return of the credit balance shaft 62 in the total cycle would result in disengaging the clutch dog 54 from disc 55 after only one revolution of the cams, a bell crank lever 69 is provided and pivoted to a stationary bracket 71 secured to a fixed shaft 72 disposed beneath the shaft 62. The latch arm of said bellcrank has a notch engageable with a pin 73 on the push link 66. A spring 74 exerts a clockwise pull on the lever so that when the push link is lowered, a notch in the latch arm of the lever 69 engages the pin 73 on the link, and a roller 75 on the follower arm bears on the surface of the cam 53. Thus, the push link 66 is held depressed, which through lever 57 permits the second revolution of the cams, the return of the credit balance shaft to normal position in the total cycle being ineffective to release the link and allowed for by the elongated recess 65 in the link. Before completion of the second revolution of the cams, the high surface of cam 53 bearing on roller 75 rocks the bell crank 69 counter clockwise to release the push link 66 and lever 57 which lever through spring 61 returns to normal position to disengage the clutch dog 54 from the disc 55.

It is understood that data printed on the first item cycle after total taking is the data recorded on the card sensed in the last item cycle preceding total taking which card set into operation the total taking control mechanism. Accordingly the normal operation of the mechanism will result in printing the data set up in the setting plate on the same line as the data recorded in said card. Should the mode of operation require the printing of the preset data on a separate line, that result could be obtained merely by inserting a space card for the first card in each new designation group of cards.

It will be seen that the push link 66 may be disabled by manually raising the link to the position where pin 64 on the rock arm 63 engages a recess 76 on the link. In such raised position the rocking of shaft 62 is ineffective to trip the clutch dog 54 due to the lost motion in the pin and slot connection between the link 66 and lever 57.

In order to allow for a variety of modes of operation of the device additional clutch control mechanism is provided which enables the entry of such preset data at times other than in conjunction with the total taking operation of the machine. As best seen in Fig. 3 an additional push link 81 is formed with one end slotted to encompass a pin 82 on the bellcrank lever 57, its other end pivoted to an arm 83 secured to the shaft 45. A yieldable lever 84 pivoted to said link has a shoulder normally engaging the pin 82, and it also carries a roller 85 adapted to bear on the surface of cam 53. A second rock arm 86 secured to the shaft 45 on the inner side of the machine frame 1 carries a pin 87 engaging a recess 88 in the flattened head of a shouldered plunger 89 yieldably supported by a spring 91 in a perforated bracket plate 92 mounted on the machine frame.

As seen in Fig. 2, a separate Bowden wire 93 connects one of the lower translator pins 15 with an upper pin 94 separately mounted directly beneath the plunger 89 in a bracket 95 on the frame of the translator unit. Said wire is provided for control purposes in the commonly used arrangement wherein a predetermined index position of a card is designated a control position, as well known to this art. Accordingly, it will be seen that the sensing of a card having its control position punched will actuate the control wire 93 to raise the plunger 89 which rocks the shaft 45 resulting in rocking the clutch trip arm of bellcrank 57 through the lever 84 pivoted to the push link 81.

Upon engagement of the clutch near the end of the cycle in which the control hole was sensed and resultant rotation of the cams 52 and 53 into the following cycle, the high dwell of cam 53 bearing on the roller 85 rocks the lever 84 counterclockwise against tension of a spring 96 to disengage it from the pin 82 so as to permit return of the trip arm to normal irrespective of the position of the push link 81. It will be seen that this card control hole clutch tripping means may be disabled by manually placing a lower recess 97 in the plunger 89 in engagement with the pin 87 on the rock arm 86, in which raised position the plunger will be held out of range of the actuating translator pin 94.

It is apparent that when the data set up in the setting plate 28 is of a numeric nature for inclusion in a totaling operation, control of the clutch by a control wire 93 as above described enables entry of such data in the total for the same account as pertains to the card provided with the control perforation. In this mode of operation the first mentioned clutch control mechanism actuated by the shaft 62 would be set disabled by the manual adjustment of the push link 66 as above described. When the data set up in the setting plate represents alphabetical text to be printed, either or both of said clutch control mechanisms may be set in their respective enabling positions depending on the requirements of the user.

While the above description and drawings disclose the invention in a preferred embodiment as adapted for a particular use it is apparent that many changes and modifications can readily be made to adapt it for various other uses without exceeding its scope. Particularly in respect to timing, it can be seen that merely by eliminating the delay in the clutch engagement, the device could be adapted to achieve printing of the preset data in the same cycle and on the same line as the data contained in a controlling card.

Accordingly, I do not limit myself to the exact form herein shown and described, nor to anything less than the whole of the invention set forth, and as hereinafter claimed.

What I claim as new, and desire to secure by Letters Patent is:

1. In a machine of the class described the combination with a plurality of members differentially settable in data recording positions, stops for each of said members, record card feeding and sensing means, and means for selectively actuating said stops in accordance with data sensed by said sensing means, of a normally idle member adapted to support a plurality of data denoting elements manually settable within said member, operating means for said member and operable concomitantly with the operation of said sensing means, means interposed between said member and said stops for selectively actuating upon the actuation of said member said stops in accordance with the data denoted by said elements, and control means responsive to the operation of said sensing means for enabling said operating means.

2. In a machine of the class described the combination with a plurality of members differentially settable in data recording positions, stops for each of said members, record card sensing means, and means for selectively actuating said stops in accordance with data sensed by said sensing means, of set-up means including a setting member and a plurality of elements manually settable in said member in positions for denoting a constant item of data, operating means for reciprocating said elements concomitantly with the operation of said sensing means, and means interposed between said elements and said stops and responsive to the reciprocation of said elements for selectively actuating said stops in accordance with the data denoted by said elements.

3. In a card controlled machine of the class described a plurality of differential members, selectively actuable stops for each of said members, reciprocable sensing means for detecting a data-representative pattern of a record card, reciprocable means comprising a setting member and a plurality of elements manually settable therein to denote a data-representative pattern, means interposed between said stops and said sensing means for actuating said stops in accordance with the pattern detected by said sensing means, and means interposed between said stops and said manually settable means for actuating said stops in accordance with the pattern denoted by said manually settable means, operating means for reciprocating said manually settable means concomitantly with said sensing means, and control means responsive to the operating of said sensing means for enabling said operating means.

4. In a card controlled machine of the class described, a plurality of differential members, means for sensing a record card, means for controlling said members in accordance with a data-representative pattern detected by said sensing means, a reciprocable member adapted to contain a plurality of elements manually settable in data-representative patterns, means responsive to the reciprocation of said member for controlling said differential members in accordance with the data-representative pattern set in said member, operating means for reciprocating said member, and means controlled by said sensing means upon sensing a special representation on a card for rendering said operating means effective.

5. In a card controlled tabulating machine the combination with a plurality of differential type bars, card sensing means for setting said bars in tabulating operations of the machine, totalizers for said bars, and a totalizer control member operable in total taking operations of the machine, of a normally idle setting member having a plurality of selectable data denoting positions disposed thereon and supporting a plurality of manually settable elements in a preselected data-representative pattern, means responsive to the actuation of said normally idle member for setting said bars in accordance with data represented by said elements, operating means for said normally idle member, and control means responsive to the operation of said totalizer control member and effective subsequent to a total taking operation for enabling said operating means.

6. In a card controlled machine of the class described, the combination with a plurality of differential type bars, means for sensing a record card, means controlled by said sensing means for setting said bars in tabulating operations of the machine, and a totalizer control member operable in total taking operations of the machine, of a normally idle member supporting a plurality of manually settable elements in a data-representative pattern, means responsive to the actuation of said normally idle member for setting said bars in accordance with data represented by said elements, operating means for said normally idle member, means actuable by said sensing means for rendering said operating means effective, and means actuable by said totalizer control member for rendering said operating means effective.

7. In a motor driven tabulating machine having computing and printing mechanism under control of record cards, and operating continuously through a succession of cycles, the combination of a totalizer control member displaced in the course of a cycle preceding a total cycle and restored in the course of the total cycle, manually settable means including a setting member arranged to support a plurality of insertable elements in any data representative pattern and operable for controlling said computing and printing mechanism, normally idle operating means for said manually settable means, and control means including a part actuable by said totalizer control member and effective in cycles subsequent to the displacement of said member for enabling the operation of said operating means.

8. In a card controlled machine of the class described, the combination of set up mechanism including a plurality of individual members actuable in accordance with pattern representations of data, card sensing means including a plurality of pins individually reciprocable under control of a card, a plurality of wires interposed between said members and said pins and responsive to the reciprocation of said pins for actuating said members in accordance with the data-representative pattern of a card, a data denoting device comprising a reciprocable setting plate supporting manually settable actuating elements in a data-representative pattern, means operable for reciprocating said plate, and a plurality of wires interposed between the same said members and said elements and responsive to the reciprocation of said elements for actuating said members in accordance with the data-representative pattern manually set in said plate.

9. In a card controlled machine of the class described, the combination of set up mechanism including an individually actuable member for each index position of a record card, card sensing means including a plurality of pins individually reciprocable under control of a card, a reciprocable setting plate for supporting actuating elements manually settable in said plate in a data-representative pattern, and wires for actuating each member, one of said wires responsive to the reciprocation of a pin and one of said wires responsive to the reciprocation of an element for actuating each member.

10. In a card controlled machine of the class described, the combination of set up mechanism including a plurality of individual members actuable in accordance with pattern representations of data, record card sensing means including a plurality of pins individually reciprocable under control of a card, wires, one interposed between each pin and a corresponding member and responsive to the reciprocation of said pin for actuating said member, a data denoting device comprising a reciprocating plate having means for supporting a plurality of manually settable member actuating elements in a data-representative pattern, and wires, one interposed between each element and a corresponding member and responsive to the reciprocation of said element for actuating said member.

11. In a card controlled machine of the class described, the combination of set up mechanism including an individually actuable member corresponding to each index position of a record card, a sensing pin for each of said members reciprocating under control of a card, a reciprocable setting plate having index positions represented by perforations therein, an individual actuating element for each of a preselected group of said members, said elements manually insertable in said perforations, operating means for reciprocating said plate, a wire interposed between each member and a corresponding pin and responsive to the reciprocation of said corresponding pin for actuating said member, and a wire interposed between each member of said preselected group of members and a corresponding actuating element and responsive to the reciprocation of said corresponding element for actuating said member.

JOHN MUELLER.

REFERENCES CITED

The following references are of record in the file of this patent:

UNITED STATES PATENTS

| Number | Name | Date |
| --- | --- | --- |
| 957,221 | Lamkin | May 10, 1910 |
| 1,245,505 | Powers | Nov. 6, 1917 |
| 1,848,106 | Carroll | Mar. 8, 1932 |
| 2,274,053 | Ferry | Feb. 24, 1942 |
| 2,285,353 | Pierce | June 2, 1942 |